(12) United States Patent
Guneydas

(10) Patent No.: US 10,380,051 B1
(45) Date of Patent: Aug. 13, 2019

(54) USB BAITING METHOD AND DESIGN

(71) Applicant: KIMBERLY-CLARK WORLDWIDE, INC., Neenah, WI (US)

(72) Inventor: Ismail Guneydas, Frisco, TX (US)

(73) Assignee: KIMBERLY-CLARK WORLDWIDE, INC., Neenah, WI (US)

( * ) Notice: Subject to any disclaimer, the term of this patent is extended or adjusted under 35 U.S.C. 154(b) by 0 days.

(21) Appl. No.: 16/320,523

(22) PCT Filed: Aug. 11, 2016

(86) PCT No.: PCT/US2016/046487
§ 371 (c)(1),
(2) Date: Jan. 25, 2019

(87) PCT Pub. No.: WO2018/031015
PCT Pub. Date: Feb. 15, 2018

(51) Int. Cl.
*G06F 13/38* (2006.01)
*G06F 13/40* (2006.01)
(Continued)

(52) U.S. Cl.
CPC .............. *G06F 13/385* (2013.01); *G06F 8/61* (2013.01); *G06F 13/4081* (2013.01);
(Continued)

(58) Field of Classification Search
CPC .............. G09B 19/0053; G06F 13/385; G06F 13/4081; G06F 21/34; G06F 21/50; G06F 21/577; G06F 2213/0042
See application file for complete search history.

(56) References Cited

U.S. PATENT DOCUMENTS 7,590,837 B2 9/2009 Bhansali et al.
8,248,237 B2 8/2012 Fitzgerald et al.
(Continued)

FOREIGN PATENT DOCUMENTS

CN 102479296 A 5/2012
CN 102663283 A 9/2012
(Continued)

*Primary Examiner* — Glenn A. Auve
(74) *Attorney, Agent, or Firm* — Kimberly-Clark Worldwide, Inc.

(57) ABSTRACT

A method for training personnel includes providing a lure device including a unique lure device identifier; providing a data-gathering application to read files and registry entries from a first network-attached computer; recognizing a plug-in event when the lure device is connected to the first network-attached computer; and associating a user with the first network-attached computer. A system includes a lure device including a unique lure device identifier; a first network-attached computer configured to generate a registry entry when the lure device is connected to the first network-attached computer; a data-gathering application configured to determine an identity of the first network-attached computer and to read the registry entry and the lure device identifier on the first network-attached computer; and a reporting application configured to associate a user with the first network-attached computer.

20 Claims, 1 Drawing Sheet

(51) Int. Cl.
*G06F 21/57* (2013.01)
*G06F 21/34* (2013.01)
*G06F 21/50* (2013.01)
*G06F 16/953* (2019.01)
*G06F 8/61* (2018.01)
*G09B 19/00* (2006.01)

(52) U.S. Cl.
CPC .......... *G06F 16/953* (2019.01); *G06F 21/34* (2013.01); *G06F 21/50* (2013.01); *G06F 21/577* (2013.01); *G06F 2213/0042* (2013.01); *G09B 19/0053* (2013.01)

(56) References Cited

U.S. PATENT DOCUMENTS

| | | | |
|---|---|---|---|
| 8,478,860 B2* | 7/2013 | Roberts | G06F 21/552 |
| | | | 702/186 |
| 8,484,736 B2 | 7/2013 | Hahn et al. | |
| 8,621,644 B2 | 12/2013 | Chan et al. | |
| 8,635,698 B2 | 1/2014 | Duncan et al. | |
| 8,719,909 B2 | 5/2014 | Fitzgerald et al. | |
| 8,750,797 B2 | 6/2014 | Ketari | |
| 8,955,109 B1* | 2/2015 | Satish | G06F 21/577 |
| | | | 726/22 |
| 9,031,536 B2 | 5/2015 | Fitzgerald et al. | |
| 9,117,096 B2 | 8/2015 | Krummel | |
| 9,813,454 B2* | 11/2017 | Sadeh-Koniecpol | ......... |
| | | | G06F 16/951 |
| 10,237,302 B1* | 3/2019 | Kras | H04L 63/1483 |
| 2005/0246455 A1 | 11/2005 | Bhesania et al. | |
| 2007/0074050 A1 | 3/2007 | Camiel | |
| 2007/0283444 A1 | 12/2007 | Jang | |
| 2011/0219453 A1 | 9/2011 | Turbin | |
| 2012/0117280 A1 | 5/2012 | Ballot et al. | |
| 2013/0079563 A1 | 3/2013 | Chiu et al. | |
| 2013/0227691 A1 | 8/2013 | Aziz et al. | |
| 2013/0263281 A1 | 10/2013 | Chan et al. | |
| 2014/0101345 A1 | 4/2014 | Ranta | |
| 2014/0199664 A1 | 7/2014 | Sadeh-Koniecpol et al. | |
| 2014/0298008 A1 | 10/2014 | Hulick | |
| 2015/0074820 A1 | 3/2015 | Toda et al. | |
| 2015/0248255 A1 | 9/2015 | Feistel et al. | |

FOREIGN PATENT DOCUMENTS

| | | |
|---|---|---|
| CN | 103593616 A | 2/2014 |
| EP | 2565808 A1 | 3/2013 |
| JP | 2010262335 A | 11/2010 |
| WO | 09082963 A1 | 7/2009 |

* cited by examiner

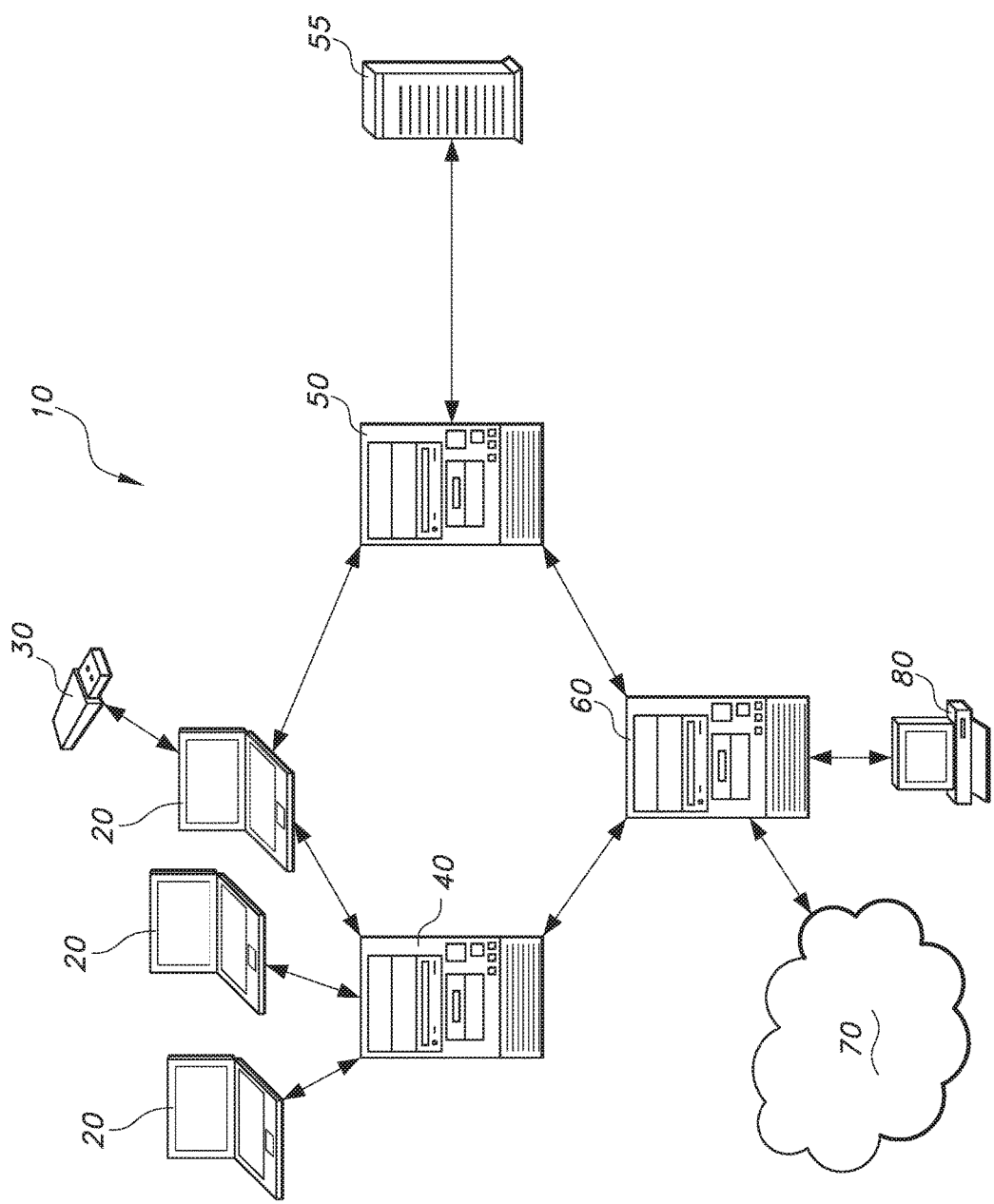

USB BAITING METHOD AND DESIGN

BACKGROUND

Universal Serial Bus (USB) baiting is one of the most common ways in which computer hackers exploit vulnerabilities in secured computer systems. Hackers can place malicious software or malware on inexpensive and highly portable USB drives and then leave those drives in places where they might be found by members of the public or even employees of a specific company or organization. Companies can hire third party vendors to test how likely that company's users are to plug in unknown USB drives. Third-party vendor solutions place on USB drives software that imitates malware and that is intended to "infect" computers used for company activities.

One limitation with this approach, however, is that the "malicious" software will also install and run on non-company (e.g., home) computers because the software cannot differentiate between company and non-company computers, leading to unintended collateral infections and potentially irate employees. Another key limitation is that the software cannot detect whether USB drives are simply plugged in to a computer. In prior vendor solutions, one of the following two scenarios must happen for the USB drive to be detected: 1) The user manually executes the software on the USB drive; or 2) The user's computer is configured to enable Autoplay, a setting that automatically executes software on a USB drive when the USB drive is plugged in to the computer.

Another limitation in prior vendor solutions is a requirement that the software be able to contact an application server at the time of software execution, i.e., when the USB drive is plugged in. If contact with the application server cannot be made, then detection of the USB drive software execution cannot be made.

The industry would benefit from a system and method wherein one can determine whether an unauthorized USB drive is plugged into a computer and whether the user acts on the contents of that drive without installing even imitation malware on the computer. It would also be a benefit to have a solution that can differentiate between company/organization computers of concern and private computers that are not part of the test population.

SUMMARY

Objects and advantages of the disclosure will be set forth in part in the following description, or can be obvious from the description, or can be learned through practice of the disclosure.

The system and method described herein provide a simple-to-administer USB baiting solution that has visibility to all USB drive activity, even without execution, as well as visibility to USB activity after it has occurred regardless of central server availability.

In accordance with one aspect of the present disclosure, a method for training personnel with respect to computer security includes providing a lure device configured to include a universal serial bus (USB) connector or to be connectable using a USB connector, wherein the lure device includes a unique lure device identifier; providing a data-gathering application to read files and registry entries from a first network-attached computer; recognizing a plug-in event when the lure device is connected to the first network-attached computer by the registry entries generated in the first network-attached computer in the plug-in event; reporting the plug-in event to a reporting server; and associating a user with the first network-attached computer.

In accordance with another aspect of the present disclosure, a system for training personnel with respect to computer security includes a lure device configured to include a USB connector or to be connectable using a USB connector, wherein the lure device includes a unique lure device identifier; a first network-attached computer configured to generate a registry entry when the lure device is connected to the first network-attached computer; a data-gathering application resident on a second network-attached computer, wherein the data-gathering application is configured to determine an identity of the first network-attached computer, and to read the registry entry and the lure device identifier on the first network-attached computer; and a reporting application configured to receive the identity of the first network-attached computer from the data-gathering application and to associate a user with the first network-attached computer.

In accordance with still another aspect of the present disclosure, a system for training personnel with respect to computer security includes a lure device including a unique lure device identifier, wherein the lure device is a portable USB drive; a lure file stored on the lure device; a first network-attached computer configured to generate a registry entry when the lure device is connected to the first network-attached computer; a data-gathering application resident on a second network-attached computer, wherein the data-gathering application is configured to determine an identity of the first network-attached computer, and to read the registry entry and the lure device identifier on the first network-attached computer; a reporting application configured to receive the identity of the first network-attached computer from the data-gathering application and to associate a user with the first network-attached computer; and a web server configured to transmit a teachable moment web page to the first network-attached computer when the lure file is activated.

In accordance with yet another aspect of the present disclosure, a method for training personnel with respect to computer security includes providing a lure device including a unique lure device identifier and a lure file, wherein the lure device is a portable USB drive; providing a data-gathering application to read files and registry entries from a first network-attached computer; recognizing a plug-in event when the lure device is connected to the first network-attached computer by the registry entries generated in the first network-attached computer in the plug-in event; associating a user with the first network-attached computer; responding to an activation of the lure file by transmitting a teachable moment web page to the first network-attached computer; and reporting the plug-in event and the lure file activation to a reporting server.

BRIEF DESCRIPTION OF THE DRAWING

The present disclosure will be more fully understood, and further features will become apparent, when reference is made to the following detailed description and the accompanying drawing. The drawing is merely representative and is not intended to limit the scope of the claims.

FIG. 1 is a diagram view of a USB baiting solution system incorporating a system and method in accordance with aspects of the present disclosure.

Repeat use of reference characters in the present specification and drawing is intended to represent the same or analogous features or elements of the present disclosure. The drawing is representational and is not necessarily drawn to scale. Certain proportions thereof might be exaggerated, while others might be minimized.

DETAILED DESCRIPTION

Reference will now be made in detail to one or more aspects of the disclosure, examples of the disclosure, examples of which are illustrated in the drawing. Each example and aspect is provided by way of explanation of the disclosure, and is not meant as a limitation of the disclosure. For example, features illustrated or described as part of one aspect can be used with another aspect to yield still a further aspect. It is intended that the disclosure include these and other modifications and variations as coming within the scope and spirit of the disclosure.

For purposes of ease of explanation only, the system described herein is applied to a typical company computer network. It should be readily appreciated that the present methods and systems can be applied to any closed computer network.

Among other limitations with prior vendor solutions, there is a gap in detection of USB drives that are plugged into computers. If Autoplay is disabled and a user does not manually run the software placed on the USB drive, then the USB drive will not be detected, even if plugged in.

The system and method described herein provide a simple-to-administer USB baiting solution that has visibility to all USB drive activity, even without execution, as well as visibility to USB activity after it has occurred regardless of central server availability. The system and method described herein can differentiate between company and non-company computers, or between target population computers and computers of no interest. The additional data gathered by the solution described herein allows more robust data analytics while minimizing the network bandwidth and performance impact on the computers.

The system and method described herein provide a USB baiting solution that can provide better metrics on the use of a USB drive as this system can collect not only USB application execution activities but also activities such as plugging in the USB drive. The USB baiting solution also simplifies the way a function such as an information technology (IT) security organization can determine which user accessed the device without needing to install software on an individual computer. The USB baiting solution differentiates between company and non-company computers, removing the threat of employees exposing their personal devices to the baiting exercise. In addition, the USB baiting solution can collect smaller sets of data for analytics, while correlating them with company information on the computer to provide better analytics. Finally, the USB baiting solution allows data gathering without requiring additional actions to alter the computer or to remove "malicious" software installed by prior vendor solutions.

Training and testing employees with respect to malware is important because USB drives are responsible for introducing a high volume of malicious software onto the company computer networks and represent a large cost to remediate. The solution described herein can be used to develop security awareness activities at offices domestically and internationally and thereby reduce risk and the occurrence of remediation costs. The solution's "no-touch" detection and its ability to distinguish company computers allows a company to minimize potential liability caused by violating international privacy laws and regulation. The data analytics portion of the solution can calculate risk thresholds according to job characteristics such as department, job functions, and locations, and can be correlated with any other characteristics.

The USB baiting solution described herein is presented in the context of the Windows Operating System due to its prevalence in business environments, but the solution can be used equally in any modern operating system. The Windows Operating System generates multiple files and registry entries about a USB drive when the USB drive is plugged into a computer running the Windows Operating System. The USB baiting solution uses a central application to read the set of descriptive files and registry entries that remain even when the USB drive is removed from the computer. For example, for Windows Operating Systems the USB drive data is typically collected under the HKLM\System\CurrentControlSet\Enum\USBSTOR\ registry keys.

The USB baiting solution described herein is a modular system including a number of component modules. First, the modular system includes one or more data gathering applications to read the files and registry entries from remote computers. Next, the modular system can include one or more structured databases including unique identifiers for all bait USB drives to be distributed as well as other associated data, along with results information retrieved by a central management application.

The modular system can also include a data analytics engine, distributing data on one or many servers, to correlate and perform analysis on the resulting information. In addition, the modular system can include one or more user directories including descriptive employee data, and a web server including a webpage with instructions for users on how to appropriately treat USB drives.

Because the USB baiting solution described herein is modular, a company or other organization can substitute components with a mix of custom-written software, off-the-shelf software, open source software, and/or manual processes. This modularity maximizes compatibility, scalability, and extensibility. For example, a company can create its own database, analytics engine, and leveraged data gathering functionality using Microsoft's System Center Configuration Manager (SCCM) software. In another example, Microsoft Active-Directory can be used as a user directory.

The USB baiting solution described herein provides advantages over prior vendor solutions because the USB baiting solution remotely reads the residual files created by the Windows Operating System after a USB drive is inserted, providing near-perfect accuracy of results, reduced administrative costs, and significantly decreased potential liability from privacy laws and regulations. The USB baiting solution uses a central server to pull data from the computers, whereas prior vendor solutions do not read the residual files and entries and require software on the USB drive to execute and push data to a central server. The push methodology means prior vendor solutions are traditionally monolithic and resistant to evolving network requirements.

As illustrated in FIG. 1, the USB baiting solution system 10 can be used with one or more network-attached computers 20 in the network of a company or other organization. The network-attached computers 20 can be desktop computers, laptop computers, tablet computers, or any similar computing device. Such network-attached computers 20 can be attached to the network via wired connection, WiFi connection, or any other suitable connection. These network-attached computers 20 are considered to be in-scope for the USB baiting tests and in the target population of the testing.

Another component of the USB baiting solution system 10 is a lure device 30. The lure device 30 is a piece of computer or related hardware that is connectable to a computer using a USB connection, either directly or with a USB cable. The lure device 30 is selected to be a device that one might be tempted to plug into a computer to see if it works or what might be stored on it. In one aspect, the lure device 30 is a portable USB drive. In other aspects, the lure device 30 can be a mouse, a keyboard, a microphone, a telephone, a hard drive, a tablet, a camera, a monitor, an exercise monitor, headphones, a speaker, a headset, or any other suitable device. USB drives are generally preferred because they can be used to store files, they are portable, they can be rather easily lost, and because finding one in a public place is not an unusual or suspicious event.

Each lure device 30 preferably includes a unique lure device identifier to allow identification of the specific lure device 30 plugged in by a user.

The lure device 30 can optionally include a lure file. The lure file can have an intriguing or interest-piquing name, perhaps hinting at clandestine contents. For example, the lure file can be named something like "2016 Executive Compensation" or "Company Computer Passwords." The lure file provides an additional level to the USB baiting tests. In addition to testing whether employees will simply plug in a lure device 30, the lure file allows the testing to determine whether an employee will activate, run, execute, or install a potentially-harmful piece of code or software. In this sense, the lure file takes the place of what might otherwise be malware on a USB drive if the lure device 30 were not part of a test.

Another component of the USB baiting solution system 10 is a remote data reader 40. The remote data reader 40 is a central data-gathering application configured to read the residual files and registry entries created after inserting a USB drive into one of the network-attached computers 20. The remote data reader 40 can be resident on a separate network-attached computer or server and is preferably on the same network as the network-attached computers 20. The remote data reader 40 queries all company computers attached to the company network on a periodic basis. This query method adds to the safety of the USB baiting solution system 10 because the registry read 40 does not query computers that are not attached to the company network, this is a safe solution. Further, if a computer user mistakenly connects a device or computer to the company network, the IT security organization will not have that user's data because the remote data reader 40 needs to have administrator access to computers and other devices. This also assures that the IT security organization only obtains data for devices it owns.

In other aspects of the present disclosure, the remote data reader 40 can read data remotely over network, where the data can be any files including registry files and/or system files. MICROSOFT-based operating systems hold the desired data in registry files. Other operating systems, however, store the desired data in different locations or different files. The USB baiting solution system 10 described herein will read data from registry files for MICROSOFT-based operating systems and directly from the file systems where the data resides for other operating systems.

Another component of the USB baiting solution system 10 is a web application server 50 responsible for displaying a website when a browser is directed to the uniform resource locator (URL) associated with the web application server 50. When a user clicks on, executes, or otherwise engages the lure file, the user is connected to the web application server 50. Once connected to the web application server 50, the user is shown a teachable moment page 55, a web page that displays basic security awareness education relating to USB drive/lure device 30 handling. The user is referred to this page if the user runs the lure file executable resident on the lure device 30.

The USB baiting solution system 10 also includes a reporting server 60, which is a server that collects, stores, and displays data. The reporting server 60 receives lure device 30 plug-in information from the remote data reader 40, where such data includes the existence of a plug-in event, the lure device identifier of the lure device 30 that was plugged in, and the identity of the network-attached computer 20 into which the lure device 30 was plugged. The reporting server 60 also receives lure file activation data from the web application server 50.

The data collected by the reporting server 60 is used by a data analytics solution 70, which is a process for taking large amounts of data and generating curated sets of data for use in decision support. Data analytics can refer to an application sorting and generating the data, its accompanying server hosting the application, or a service that analyzes the data. The data passed on by the reporting server 60 can be added to other data such as the identity of a user associated with a specific network-attached computer 20, the job role, department, supervisor, etc. of that user such that reports of various types can be generated.

The USB baiting solution system 10 also includes a structured database that includes a listing of the unique lure device identifiers for each lure device 30.

Such reports and data can be presented to a security specialist, administrator, or other appropriate person through an administrator computer 80, allowing that person to see the performance of employees.

The USB baiting solution described herein provides better metrics on the use of a lure device 30 because USB baiting solution system 10 can collect not only USB application execution activities (e.g., clicking on the lure file) but also activities such as plugging in the lure device 30. The USB baiting solution described herein also allows an IT security organizations to determine who accessed the lure device 30 without installing software on individual network-attached computers. Notice of a plug-in event is accomplished by modification to the registry of the network-attached computer 20 rather than installing software on the network-attached computer 20.

The USB baiting solution protects non-network-attached computers such as home computers because it does not install software on a computer. Although the registry in the home computer will be altered, as it would with plugging in any USB device, the plug-in will not be detected. The lack of installed software removes the threat of employees exposing their personal devices to the baiting exercise.

The USB baiting solution also collects smaller sets of data for analytics, while correlating such data with company information (department, function, reporting structure, employee information, etc.) to provide better analytics. The riskiest regions, departments, job functions, and offices can be identified and provided with focused training if desired.

Being able to identify plug-in events provides another level of understanding with respect to how users interact with a portable device. The USB baiting solution described herein allows for social engineering in identifying risky behaviors and promoting beneficial behaviors in computer users. The human tendency to trust needs to be replaced with a healthy skepticism with respect to found devices because two out of three lost USB drives have malware on them.

In a particular use of the USB baiting solution described herein, an IT security organization acquires a number of lure devices 30 and places a lure file on each lure device 30. Each lure device 30 is surreptitiously placed in a common area such as a cafeteria, lobby, restroom, sidewalk, parking lot, building entrance, hallway, conference room, coffer station, copier, or any other suitable location in which the lure device 30 is likely to be found.

An individual picking up a lure device 30 faces a number of options. First, the individual can be cautious and simply discard the lure device 30. The individual can also send the lure device 30 to a security officer, making the lure device 30 available for testing under the appropriate conditions. This option is especially useful if the USB device actually includes malware and is not part of the test. Finally, the individual can plug the lure device 30 into that individual's network-attached computer 20.

The simple act of plugging the lure device 30 into a network-attached computer 20 will be recorded by IT security when the remote data reader 40 reads the residual files, registry entries, and lure device identifier generated by the plug-in event. The reporting server 60 accesses the data provided by the remote data reader 40, performs any desired data analytics 70, and reports the event to the administrator computer 80.

In addition, if the individual clicks on or otherwise executes the lure file resident on the lure device 30, the individual's browser will be connected to the web server 50 and the individual will be presented with a teachable moment web page 55. This access will also be recorded by the reporting server 60 and included in the data analytics 70 and the report to the administrator computer 80. The individual can then be given additional notice, a warning, further training, or any other response desired by the IT security organization.

Table 1 provides a comparison of the features and test results using the USB Baiting Solution system 10 of the present disclosure as compared to a currently-available commercial tool.

TABLE 1

Comparison of the USB Baiting Solution of the present disclosure with a popular commercial tool

| | USB Baiting Solution of present disclosure | commercial tool |
| --- | --- | --- |
| IT time spent for cleanup per project | None needed | 20 hours |
| Works with existing infrastructure | Yes | No |
| Actionable Metrics | Yes | No |
| Legal issues | No | Yes |
| Safety concerns | No malware, viruses, etc. | Machines need to be infected through malware, viruses, etc. |
| Flexibility | Built by modular approach | Usually is one-piece software |
| Success rate | 49% | 32% |
| # of locations tested | 15 | 6 |
| # of USB devices deployed | 151 | 31 |
| # of people who plugged in a USB device but didn't click the lure file | 27 | Doesn't have this feature |
| # of people who plugged in multiple USB devices | 5 | Doesn't have this feature |
| # of people who clicked the same lure file multiple times | 7 | Doesn't have this feature |

In a first particular aspect, a method for training personnel with respect to computer security includes providing a lure device configured to include a universal serial bus (USB) connector or to be connectable using a USB connector, wherein the lure device includes a unique lure device identifier; providing a data-gathering application to read files and registry entries from a first network-attached computer; recognizing a plug-in event when the lure device is connected to the first network-attached computer by the registry entries generated in the first network-attached computer in the plug-in event; reporting the plug-in event to a reporting server; and associating a user with the first network-attached computer.

A second particular aspect includes the first particular aspect, further comprising including a lure file on the lure device.

A third particular aspect includes the first and/or second aspect, further comprising reporting each attempt to access the lure file to the reporting server.

A fourth particular aspect includes one or more of aspects 1-3, further comprising providing a structured database including the unique lure device identifier.

A fifth particular aspect includes one or more of aspects 1-4, wherein software is not transferred or installed from the lure device to the first network-attached computer.

A sixth particular aspect includes one or more of aspects 1-5, wherein the lure device is a portable USB drive.

A seventh particular aspect includes one or more of aspects 1-6, wherein the lure device is a mouse, a keyboard, a microphone, a telephone, a hard drive, a tablet, a camera, a monitor, an exercise monitor, headphones, a speaker, or a headset.

An eighth particular aspect includes one or more of aspects 1-7, wherein the data-gathering application is not resident on the first network-attached computer.

A ninth particular aspect includes one or more of aspects 1-8, further comprising transmitting a teachable moment web page to the first network-attached computer.

In a tenth particular aspect, a system for training personnel with respect to computer security includes a lure device configured to include a universal serial bus (USB) connector or to be connectable using a USB connector, wherein the lure device includes a unique lure device identifier; a first network-attached computer configured to generate a registry entry when the lure device is connected to the first network-attached computer; a data-gathering application resident on a second network-attached computer, wherein the data-gathering application is configured to determine an identity of the first network-attached computer, and to read the registry entry and the lure device identifier on the first network-attached computer; and a reporting application configured to receive the identity of the first network-attached computer from the data-gathering application and to associate a user with the first network-attached computer.

An eleventh particular aspect includes the tenth particular aspect, further comprising a lure file on the lure device.

A twelfth particular aspect includes the tenth and/or eleventh aspect, further comprising a structured database including the unique lure device identifier configured to be accessible by the reporting application.

A thirteenth particular aspect includes one or more of aspects 10-12, wherein the lure device is a portable USB drive.

A fourteenth particular aspect includes one or more of aspects 10-13, wherein the lure device is a mouse, a keyboard, a microphone, a telephone, a hard drive, a tablet, a camera, a monitor, an exercise monitor, headphones, a speaker, or a headset.

A fifteenth particular aspect includes one or more of aspects 10-14, wherein the lure device is configured to not transfer software to or install software on the first network-attached computer.

A sixteenth particular aspect includes one or more of aspects 10-15, further comprising a web server configured to transmit a teachable moment web page to the first network-attached computer.

In a seventeenth particular aspect, a system for training personnel with respect to computer security includes a lure device including a unique lure device identifier, wherein the lure device is a portable universal serial bus (USB) drive; a lure file stored on the lure device; a first network-attached computer configured to generate a registry entry when the lure device is connected to the first network-attached computer; a data-gathering application resident on a second network-attached computer, wherein the data-gathering application is configured to determine an identity of the first network-attached computer, and to read the registry entry and the lure device identifier on the first network-attached computer; a reporting application configured to receive the identity of the first network-attached computer from the data-gathering application and to associate a user with the first network-attached computer; and a web server configured to transmit a teachable moment web page to the first network-attached computer when the lure file is activated.

An eighteenth particular aspect includes the seventeenth particular aspect, wherein the lure device is configured to not transfer software to or install software on the first network-attached computer.

In a nineteenth particular aspect, a method for training personnel with respect to computer security includes providing a lure device including a unique lure device identifier and a lure file, wherein the lure device is a portable universal serial bus (USB) drive; providing a data-gathering application to read files and registry entries from a first network-attached computer; recognizing a plug-in event when the lure device is connected to the first network-attached computer by the registry entries generated in the first network-attached computer in the plug-in event; associating a user with the first network-attached computer; responding to an activation of the lure file by transmitting a teachable moment web page to the first network-attached computer; and reporting the plug-in event and the lure file activation to a reporting server.

A twentieth particular aspect includes the nineteenth particular aspect, wherein software is not transferred or installed from the lure device to the first network-attached computer.

While the present disclosure has been described in connection with certain preferred aspects it is to be understood that the subject matter encompassed by way of the present disclosure is not to be limited to those specific aspects. On the contrary, it is intended for the subject matter of the disclosure to include all alternatives, modifications and equivalents as can be included within the spirit and scope of the following claims.

What is claimed is:

1. A method for training personnel with respect to computer security, the method comprising:
   providing a lure device configured to include a universal serial bus (USB) connector or to be connectable using a USB connector, wherein the lure device includes a unique lure device identifier;
   providing a data-gathering application to read files and registry entries from a first network-attached computer;
   recognizing a plug-in event when the lure device is connected to the first network-attached computer by the registry entries generated in the first network-attached computer in the plug-in event;
   reporting the plug-in event to a reporting server; and
   associating a user with the first network-attached computer.

2. The method of claim 1, further comprising including a lure file on the lure device.

3. The method of claim 2, further comprising reporting each attempt to access the lure file to the reporting server.

4. The method of claim 1, further comprising providing a structured database including the unique lure device identifier.

5. The method of claim 1, wherein software is not transferred or installed from the lure device to the first network-attached computer.

6. The method of claim 1, wherein the lure device is a portable USB drive.

7. The method of claim 1, wherein the lure device is a mouse, a keyboard, a microphone, a telephone, a hard drive, a tablet, a camera, a monitor, an exercise monitor, headphones, a speaker, or a headset.

8. The method of claim 1, wherein the data-gathering application is not resident on the first network-attached computer.

9. The method of claim 1, further comprising transmitting a teachable moment web page to the first network-attached computer.

10. A system for training personnel with respect to computer security, the system comprising:
    a lure device configured to include a universal serial bus (USB) connector or to be connectable using a USB connector, wherein the lure device includes a unique lure device identifier;
    a first network-attached computer configured to generate a registry entry when the lure device is connected to the first network-attached computer;
    a data-gathering application resident on a second network-attached computer, wherein the data-gathering application is configured to determine an identity of the first network-attached computer, and to read the registry entry and the lure device identifier on the first network-attached computer; and
    a reporting application configured to receive the identity of the first network-attached computer from the data-gathering application and to associate a user with the first network-attached computer.

11. The system of claim 10, further comprising a lure file on the lure device.

12. The system of claim 10, further comprising a structured database including the unique lure device identifier configured to be accessible by the reporting application.

13. The system of claim 10, wherein the lure device is a portable USB drive.

14. The system of claim 10, wherein the lure device is a mouse, a keyboard, a microphone, a telephone, a hard drive, a tablet, a camera, a monitor, an exercise monitor, headphones, a speaker, or a headset.

15. The system of claim 10, wherein the lure device is configured to not transfer software to or install software on the first network-attached computer.

16. The system of claim 10, further comprising a web server configured to transmit a teachable moment web page to the first network-attached computer.

17. A system for training personnel with respect to computer security, the system comprising:
- a lure device including a unique lure device identifier, wherein the lure device is a portable universal serial bus (USB) drive;
- a lure file stored on the lure device;
- a first network-attached computer configured to generate a registry entry when the lure device is connected to the first network-attached computer;
- a data-gathering application resident on a second network-attached computer, wherein the data-gathering application is configured to determine an identity of the first network-attached computer, and to read the registry entry and the lure device identifier on the first network-attached computer;
- a reporting application configured to receive the identity of the first network-attached computer from the data-gathering application and to associate a user with the first network-attached computer; and
- a web server configured to transmit a teachable moment web page to the first network-attached computer when the lure file is activated.

18. The system of claim 17, wherein the lure device is configured to not transfer software to or install software on the first network-attached computer.

19. A method for training personnel with respect to computer security, the method comprising:
- providing a lure device including a unique lure device identifier and a lure file, wherein the lure device is a portable universal serial bus (USB) drive;
- providing a data-gathering application to read files and registry entries from a first network-attached computer;
- recognizing a plug-in event when the lure device is connected to the first network-attached computer by the registry entries generated in the first network-attached computer in the plug-in event;
- associating a user with the first network-attached computer;
- responding to an activation of the lure file by transmitting a teachable moment web page to the first network-attached computer; and
- reporting the plug-in event and the lure file activation to a reporting server.

20. The method of claim 19, wherein software is not transferred or installed from the lure device to the first network-attached computer.

* * * * *